(12) United States Patent  
Tanaka et al.

(10) Patent No.: US 7,701,928 B2  
(45) Date of Patent: Apr. 20, 2010

(54) TIME DIVISION MULTIPLEXING COMMUNICATION SYSTEM, TIME DIVISION MULTIPLEXING COMMUNICATION SWITCH SYSTEM, AND COMMUNICATION CONTROL METHOD OF A COMMUNICATION SYSTEM

(75) Inventors: Osamu Tanaka, Osaka (JP); Tomonori Shiomi, Osaka (JP); Akihiro Tatsuta, Kyoto (JP); Hiroyuki Watanabe, Osaka (JP); Nobuhiko Arashin, Osaka (JP); Masahiko Nagoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 756 days.

(21) Appl. No.: 11/166,875

(22) Filed: Jun. 24, 2005

(65) Prior Publication Data

US 2005/0286548 A1  Dec. 29, 2005

(30) Foreign Application Priority Data

Jun. 25, 2004  (JP)  ............................. 2004-188307

(51) Int. Cl.
*H04L 12/66* (2006.01)
(52) U.S. Cl. ..................................... 370/352; 370/395
(58) Field of Classification Search ................. 370/330, 370/443, 337, 227, 352, 229, 397, 422, 85, 370/395; 398/58

See application file for complete search history.

(56) References Cited

U.S. PATENT DOCUMENTS

| | | | |
|---|---|---|---|
| 5,119,373 A * | 6/1992 | Fredricsson et al. ......... | 370/458 |
| 5,761,197 A * | 6/1998 | Takefman .................. | 370/337 |
| 5,995,500 A * | 11/1999 | Ma et al. .................... | 370/337 |
| 6,028,860 A * | 2/2000 | Laubach et al. ........ | 370/395.64 |
| 6,539,011 B1 * | 3/2003 | Keenan et al. ............... | 370/352 |
| 6,570,861 B1 * | 5/2003 | Marsan et al. .............. | 370/330 |
| 6,778,550 B1 * | 8/2004 | Blahut ........................ | 370/443 |
| 2002/0085578 A1* | 7/2002 | Dell et al. .................... | 370/422 |
| 2004/0264961 A1* | 12/2004 | Nam et al. .................... | 398/58 |

FOREIGN PATENT DOCUMENTS

| | | |
|---|---|---|
| JP | 2-183644 A | 7/1990 |
| JP | 10-51486 A | 2/1998 |
| JP | 11-55304 A | 2/1999 |
| JP | 2003-69592 A | 3/2003 |
| JP | 2003-234715 | 8/2003 |

OTHER PUBLICATIONS

Japanese Office Action for JP 2004-188307, dated May 9, 2006.

* cited by examiner

*Primary Examiner*—Kwang B Yao
*Assistant Examiner*—Syed Bokhari
(74) *Attorney, Agent, or Firm*—RatnerPrestia (57) ABSTRACT

A communication system includes communication devices; a switch device having coaxial terminal units to which the communication device are connected, a switch unit of entirely or individually connecting the coaxial terminal units, and a switch control unit of controlling the connection status of the switch unit; and a transmittal right control device. The transmittal right control device is connected to the terminal, and manages the connection status of the switch unit, receives from the communication devices requests for time for communication with other communication devices, determines assignment of time for communications between the communication devices, notifies the communication devices of the assignment, and instructs the switch control unit not to make signals interfere among the communication devices in different combinations for communications in the same time period.

10 Claims, 7 Drawing Sheets

TIME DIVISION MULTIPLEXING COMMUNICATION SYSTEM, TIME DIVISION MULTIPLEXING COMMUNICATION SWITCH SYSTEM, AND COMMUNICATION CONTROL METHOD OF A COMMUNICATION SYSTEM

BACKGROUND OF THE INVENTION

1. Field of the Invention

The present invention relates to a time division multiplexing communication system, a time division multiplexing communication switch system, and a communication control method of a communication system for performing a demand assignment time division multiple access (TDMA).

For example, the present invention relates to a time division multiplexing communication system, a time division multiplexing communication switch system, and a communication control method of a communication system which are connected to a communication device via a coaxial cable to control communications between coaxial cables using a transmittal right for the communication device, and share a transmission band.

2. Related Art of the Invention

The time division multiplexing communication system having a communication device for performing the demand assignment TDMA communication and a transmittal right management device for assigning a transmittal right in the conventional technology is explained below by referring to the attached drawings.

The TDMA communication is widely known as a communication system in which a time slot for transmission of information is formed by time-dividing a transmission band, and the time slot is assigned to a communication device for transmitting information. In this communication system, a TDMA frame, which is a fundamental period in a transmission line, is time-divided into a number of time slots, and each communication device uses any of the time slots to transmit information to a corresponding communication device. Then, the corresponding communication device selects a time slot addressed to it, and receives the information.

In the TDMA communications, if a plurality of communication devices simultaneously use the same time slot, a plurality of signals conflict with one another and information cannot be correctly transmitted. Therefore, a time slot being used by any communication device must be prevented from being used by another communication device.

To solve this problem, in the demand assignment TDMA communications, each communication device issues a send request to a transmittal right management device each time information is to be transmitted, the transmittal right management device selects a free slot, and assigns a transmittal right to each communication device (for example, refer to Japanese Patent Application Publication No. 2-183644). Thus, the conflict among a plurality of signals can be avoided.

The entire disclosure of Japanese Patent Application Publication No. 2-183644 is incorporated herein by reference in its entirety.

Figure 9:
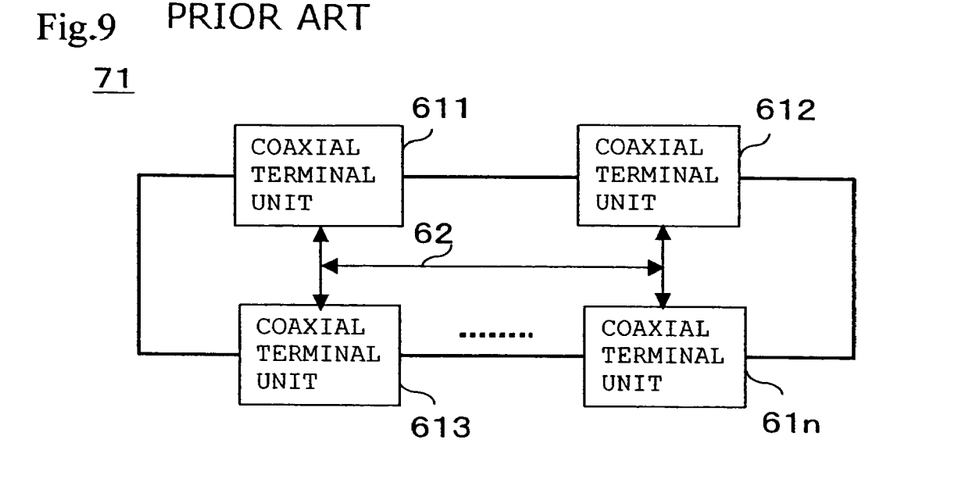
FIG. 9 is a block diagram of the configuration of the coaxial connection device according to the conventional technology.

FIG. 9 is a block diagram of the configuration of the coaxial connection device used in the demand assignment TDMA communication system according to the conventional technology.

A coaxial connection device 71 is provided with a plurality of coaxial terminal units 611 to 61n to which a coaxial cable is connected, and the coaxial terminal units 611 to 61n are all interconnected via an internal connection line 62.

Figure 10:
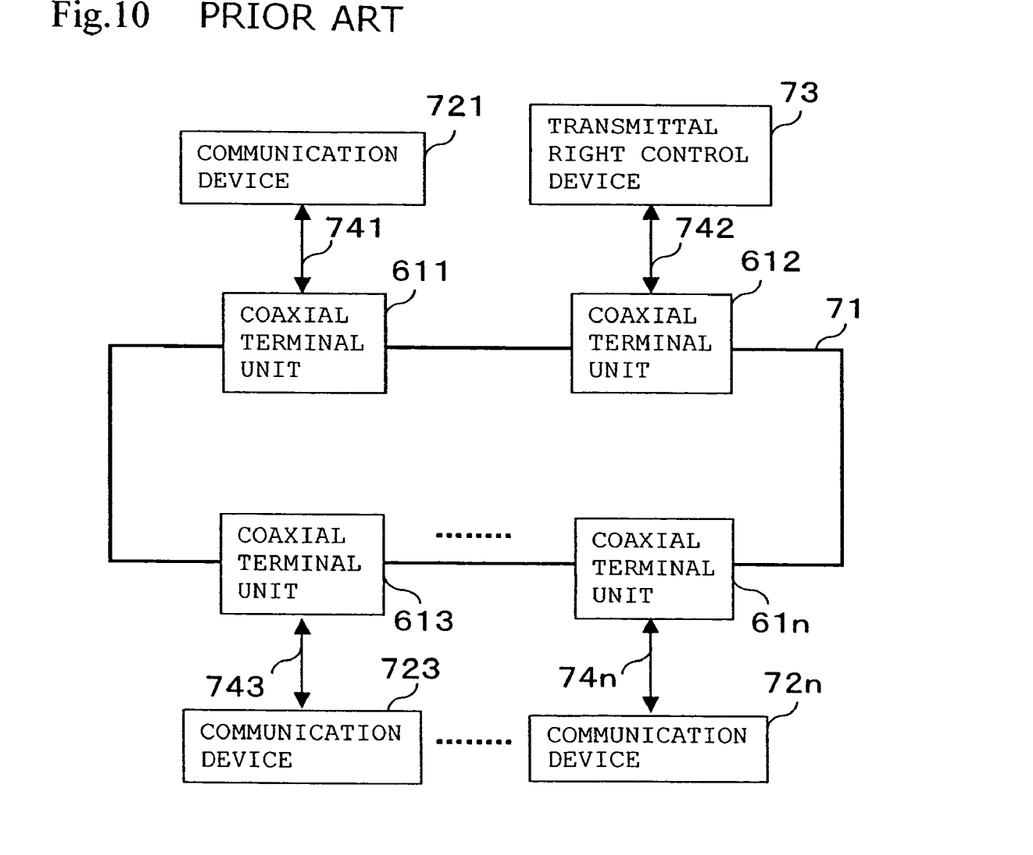
FIG. 10 shows the configuration of the communication system for performing the demand assignment TDMA communications according to the conventional technology.

FIG. 10 shows the configuration of the time division multiplexing communication system for performing the demand assignment TDMA communication according to the conventional technology.

The communication system is composed of the coaxial connection device 71, communication devices 721 and 723 to 72n, and a transmittal right control device 73. The communication device 721, the transmittal right control device 73, the communication devices 723 to 72n are connected to the coaxial terminal units 611 to 61n of the coaxial connection device 71 through coaxial transmission lines 741 to 74n.

Figure 11:
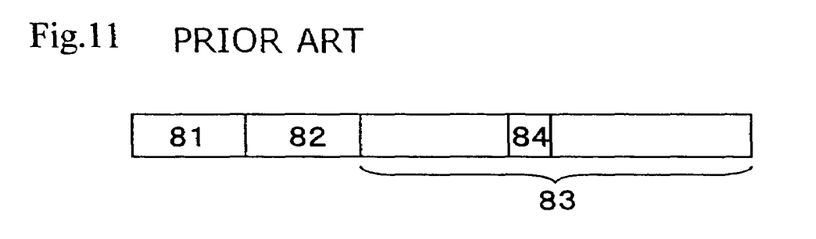
FIG. 11 shows the configuration of a time frame of the communication system for performing the demand assignment TDMA communications according to the conventional technology.

FIG. 11 is an explanatory view of the time frame of the communication system shown in FIG. 10.

A time frame is composed of frames of a send request period 81 in which the communication devices 721 and 723 to 72n transmit a transmittal right, a transmittal right notification period 82 in which the transmittal right information assigned by the transmittal right control device 73 is transmitted, and an information transmission period 83 in which the communication devices 721 and 723 to 72n transmit information among the communication devices. The information transmission period with another communication device assigned to one communication device configures one frame, and the information transmission period 83 is composed of a plurality of frames indicating the information transmission period in each communication device. In this example, a frame indicating the information transmission period between the communication device 721 and the communication device 723 assigned to the communication device 721 is defined as an information transmission period 84.

Figure 12:
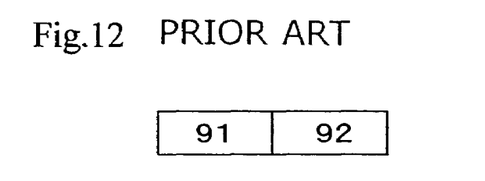
FIG. 12 shows the configuration of the send request information about the communication system for performing the demand assignment TDMA communications according to the conventional technology.

FIG. 12 is an explanatory view of the configuration of the send request information of the communication system shown in FIG. 10.

The send request information is composed of destination information 91 (communication device ID, etc.), source information 92 (communication device ID, etc.).

Figure 13:
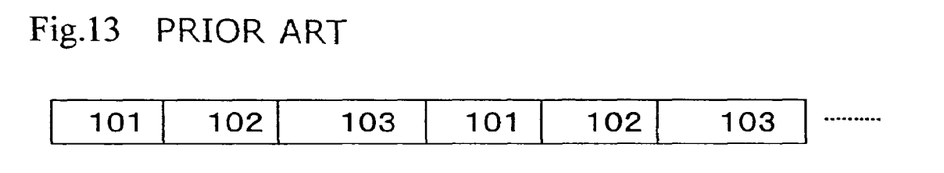
FIG. 13 shows the configuration of the assignment information about the communication system for performing the demand assignment TDMA communications according to the conventional technology.

FIG. 13 is an explanatory view of the assignment information of the communication device shown in FIG. 10.

The assignment information is composed of a combination of a plurality of destination information 101 (communication device ID, etc.) about an assigned transmittal right, source information 102 (communication device ID, etc.) about an assigned transmittal right, and assigned sending period information 103 for each communication device.

Described below are the operations of the coaxial connection device 71, the communication devices 721 and 723 to 72n, and the transmittal right control device 73 performed when information is transmitted from the communication device 721 to the communication device 723 in the communication system shown in FIG. 10.

The communication device 721 generates send request information from the destination information 91 (communication device ID, etc.) about the destination communication device 723 and the source information 92 about the source communication device 721. Then, in the send request period 81, the send request information is transmitted to the transmittal right control device 73 through the coaxial transmission line 741.

The transmission information sent from the communication device 721 is received by the coaxial terminal unit 611 connected to the coaxial transmission line 741 of the coaxial connection device 71. Then, it is transmitted to the coaxial terminal units 612 to 61n connected by the internal connection line 62 of the coaxial connection device 71, and transmitted to the coaxial transmission lines 742 to 74n connected to them.

The transmittal right control device 73 receives the transmission information from each communication device through the coaxial transmission line 742, and extracts send request information from the transmission information received in the send request period 81 shown in FIG. 11. Then, the process of assigning a transmittal right from the destination information 91 (relating to the communication device 723 in this example) and the source information 92 (relating to the communication device 721 in this example) to the communication devices 721 and 723 to 72n (relating to the communication device 721 in this example) is performed.

Then, the transmittal right control device 73 generates from the assigned transmittal right the transmittal right information to the communication devices 721 and 723 to 72n composed of the destination information 101, the source information 102, and the sending period information 103, and transmits the transmittal right information to the communication devices 721 and 723 to 72n through the coaxial transmission lines 741 to 74n in the transmittal right notification period 82.

The transmittal right information transmitted from the transmittal right control device 73 is received by the coaxial terminal unit 612 connected to the coaxial transmission line 742 of the coaxial connection device 71, transmitted to the coaxial terminal units 611 and 613 to 61n connected by the internal connection line 62, and transmitted to the coaxial transmission lines 741 and 743 to 74n connected to them.

The communication device 721 receives the transmittal right information from the coaxial transmission line 741 in the transmittal right notification period 82, and transmits transmission information to the communication device 723 through the coaxial transmission line 741 in the information transmission period 84 between the communication device 721 and the communication device 723 in the information transmission period 83 assigned by the destination information 101, the source information 102, and the sending period information 103.

The communication device 723 receives transmittal right information from the coaxial transmission line 743 in the transmittal right notification period 82, then receives the transmission information from the communication device 721 in the information transmission period 84 between the communication device 721 and the communication device 723 in the information transmission period 83 assigned according to the destination information 101, the source information 102, and the sending period information 103.

Thus, the communication devices 721 and 723 to 72n transmits a transmittal right to the transmittal right control device 73 through the coaxial connection device 71, and information can be transmitted between communication devices by the transmittal right control device 73 assigning a transmittal right at a transmittal right.

However, in the time division multiplexing communication system using the same frequency band, in a time period when communication occurs between a set of communication devices connected to the coaxial connection device 71, other communication devices cannot perform communications in the same time period and are kept waiting. Therefore, efficient transmission cannot be performed.

Therefore, the above situation may result in a delay in the transmission of information, or, for example, when the data requiring the immediacy such as an image data, data transfer may not be performed in a requested time period. Thus, in the worst case, the data to be transmitted in the time period sometimes cannot be transmitted.

The present invention has been developed to solve the above-mentioned problem, and aims at providing a time division multiplexing communication system, a time division multiplexing communication switch system, and a communication control method of a communication system capable of performing communications among a plurality of communication devices in the same time period using the same frequency band, thereby efficient transmitting information.

SUMMARY OF THE INVENTION

The $1^{st}$ aspect of the present invention is a time division multiplexing communication system, comprising:

a plurality of communication devices;

a switch device comprising a plurality of terminals to which at least the plurality of communication devices are respectively connected, a switch unit capable of mutually connecting all of the plurality of terminals and individually connecting the plurality of terminals, and a switch control unit of controlling a connection status of the switch unit; and a transmittal right control unit for managing the connection status of the switch unit, which is connected to at least one of the plurality of terminals, of (a) receiving, from the communication device, a request for time to communicate with another communication device, with all of the plurality of terminals being mutually connected, and determining allocation of the time to communicate among the communication devices at the request, (b) notifying each of the communication devices of the allocation of the determined time, and (c) instructing the switch control unit such that connections at the switch unit are conducted in a way that signals among the communication devices in a plurality of different combinations communicated in the same time period do not interfere with each other.

The $2^{nd}$ aspect of the present invention is the time division multiplexing communication system according to the $1^{st}$ aspect of the present invention, wherein the plurality of communication devices and the transmittal right control unit are respectively connected to the plurality of terminals through a coaxial cable.

The $3^{rd}$ aspect of the present invention is the time division multiplexing communication system according to the $1^{st}$ aspect of the present invention, wherein signals used in communication between the communication devices are signals at the same frequency band.

The $4^{th}$ aspect of the present invention is a time division multiplexing communication switch system, comprising:

a plurality of terminals to which a plurality of communication devices are respectively connected;

a switch unit capable of individually connecting the plurality of terminals;

a switch control unit of controlling a connection status of the switch unit; and a transmittal right control unit for managing the connection status of the switch unit, which is connected to each of the plurality of terminals, of (a) receiving, from the communication device, a request for time to communicate with another communication device, and determining allocation of the time to communicate among the communication devices at the request, (b) notifying each of the communication devices of the allocation of the determined time, and (c) instructing the switch control unit such that connections at the switch unit are conducted in a way that signals among the communication devices in a plurality of different combinations communicated in the same time period do not interfere with each other.

The $5^{th}$ aspect of the present invention is the time division multiplexing communication switch system according to the $4^{th}$ aspect of the present invention, wherein the plurality of communication devices are respectively connected to the plurality of terminals through a coaxial cable.

The 6th aspect of the present invention is the time division multiplexing communication switch system according to the 4th aspect of the present invention, wherein signals used in communication between the communication devices are signals at the same frequency band.

The 7th aspect of the present invention is a communication control method of a communication system of performing communications, among a plurality of communication devices connected in the system, by means of time division multiplexing, comprising:

a determination notification step of (a) receiving, from the communication device, a request for time to communicate with another communication device, with all of a plurality of terminals to which at least the plurality of communication devices are connected being mutually connected, (b) determining allocation of the time to communicate among the communication devices at the request, and (c) notifying each of the communication devices of the allocation of the determined time; and a control step of individually controlling a connection between the plurality of terminals such that signals among the communication devices in a plurality of different combinations communicated in the same time period do not interfere with each other.

The 8th aspect of the present invention is a communication control method of a communication system of performing communications, among a plurality of communication devices connected in the system, by means of time division multiplexing, comprising:

a determination notification step of (a) receiving, from the communication device, a request for time to communicate with another communication device, with the plurality of communication devices being respectively connected to a plurality of terminals, (b) determining allocation of the time to communicate among the communication devices at the request, and (c) notifying each of the communication devices of the allocation of the determined time; and a control step of individually controlling a connection between the plurality of terminals such that signals among the communication devices in a plurality of different combinations communicated in the same time period do not interfere with each other.

The 9th aspect of the present invention is a program used to direct a computer to function as:

the switch control unit of controlling the connection status of the switch unit; and the transmittal right control unit of determining the assignment of a time to communicate among the communication devices, and instructing the switch control unit, which belong to the time division multiplexing communication switch system according to the 1st aspect of the present invention.

The 10th aspect of the present invention is a record medium available by a computer storing the program according to the 9th aspect of the present invention.

The 11th aspect of the present invention is a program used to direct a computer to function as:

the switch control unit of controlling the connection status of the switch unit; and the transmittal right control unit of determining the assignment of a time to communicate among the communication devices, and instructing the switch control unit, which belong to the time division multiplexing communication switch system according to the 4th aspect of the present invention.

The 12th aspect of the present invention is a record medium available by a computer storing the program according to the 11th aspect of the present invention.

The present invention can provide a time division multiplexing communication system, a time division multiplexing communication switch system, and a communication control method of a communication system capable of performing communications among a plurality of communication devices in the same time period using the same frequency band, thereby efficient transmitting information.

DESCRIPTION OF SYMBOLS

11 to 1*n*, 611 to 61*n*, 330 to 333, 335 coaxial terminal unit
21 to 2*n* send request input unit
401 to 40*n* transmittal right information output unit
4 transmittal right control unit
5, 305 switch control unit 6, 306 switch unit
20 switch system
221 to 22n, 741 to 74n coaxial transmission line
231 to 23n, 310 to 313, 721, 723 to 72n communication device
31, 81 send request period
32, 82 transmittal right notification period
33, 83 information transmission period
34, 35, 84 information transmission period assigned to communication devices
41, 51, 91, 101 destination information
42, 52, 92, 102 source information
53, 103 sending period information
62 internal connection line
71 coaxial connection device
73 transmittal right control device
307 switch device
320 transmittal right control device

PREFERRED EMBODIMENTS OF THE INVENTION

The embodiments of the present invention are explained below by referring to the attached drawings.

First Embodiment

Figure 1:
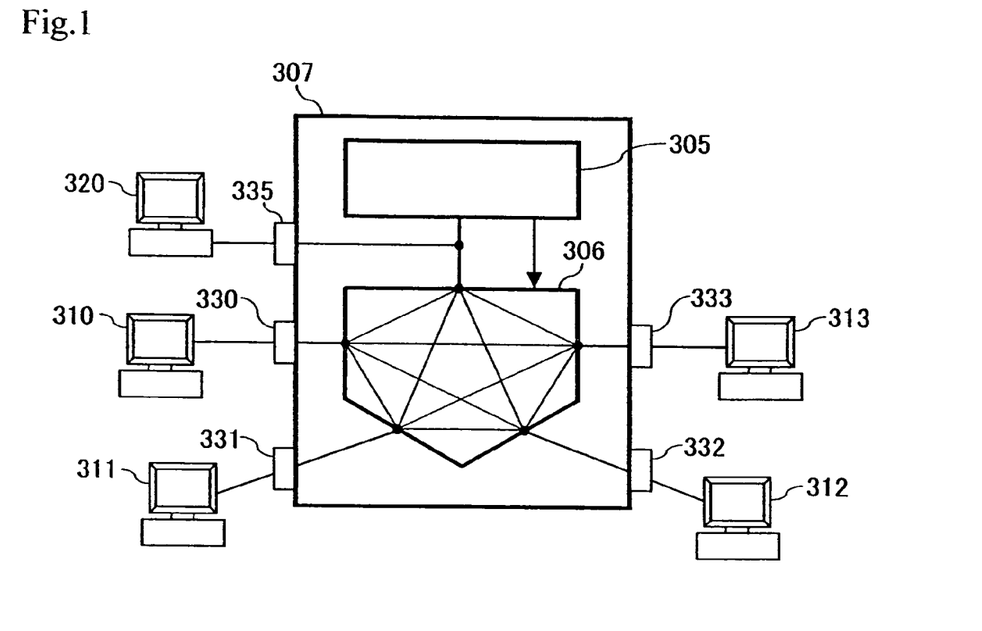
FIG. 1 shows the configuration of the time division multiplexing communication system according to the first embodiment of the present invention.
Figure 2:
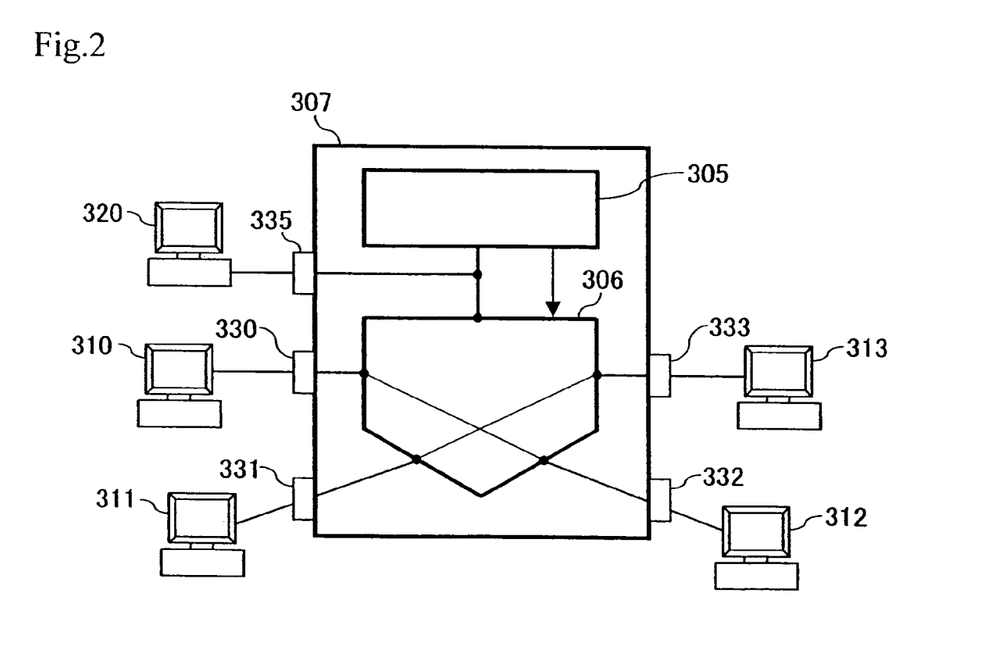
FIG. 2 shows the configuration of the time division multiplexing communication system according to the first embodiment of the present invention.

FIGS. 1 and 2 are block diagrams of the configuration of the time division multiplexing communication system according to the first embodiment of the present invention.

The time division multiplexing communication system according to the first embodiment of the present invention is composed of a switch device 307, a transmittal right control device 320 connected to the switch device 307, and communication devices 310 to 313. The communication devices 310 to 313 and the transmittal right control device 320 are connected to the coaxial terminal units 330 to 333 and 335 provided in the switch device 307 via a coaxial cable, and can communicate with one another through the switch device 307.

The transmittal right control device 320 is an example of a transmittal right control unit according to the present invention. The coaxial terminal units 330 to 333 and 335 are examples of a plurality of terminals according to the present invention.

The switch device 307 comprises a switch control unit 305 and a switch unit 306. The switch unit 306 can individually switch the connections of the coaxial terminal units 330 to 333 and 335. The switch control unit 305 controls the switch of the connection in the switch unit 306 at an instruction of the transmittal right control device 320.

FIG. 1 shows the state of the mutual connections of all coaxial terminal units 330 to 333 and 335 by the switch of the switch unit 306. FIG. 2 shows the state of the simultaneous and individual connection only between the coaxial terminal units 330 and 332 and between the coaxial terminal units 331 and 333.

Figure 3:
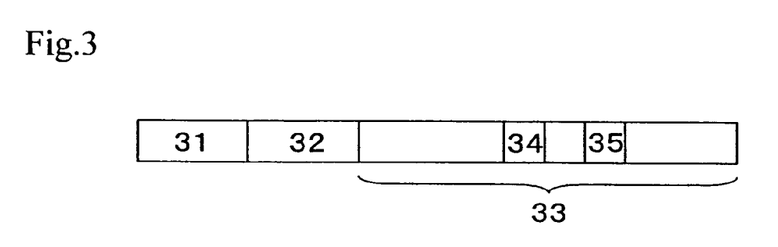
FIG. 3 shows the configuration of the time frame of the time division multiplexing communication system according to the first and second embodiments of the present invention.

FIG. 3 is an explanatory view of the time frame of the time division multiplexing communication system according to the first embodiment of the present invention.

The time frame according to the first embodiment is composed of the frames of a send request period 31 in which each of the communication devices 310 to 313 transmits a send request, a transmittal right notification period 32 in which transmittal right information assigned by the transmittal right control device 320 is transmitted, and an information transmission period 33 in which the communication devices 310 to 313 mutually transmit information.

The information transmission period assigned to one communication device with another communication device configures one frame, and the information transmission period 33 is composed of a plurality of frames indicating the information transmission period. The portion of a frame 34 in the information transmission period 33 indicates a frame which is assigned to the communication device 310 and represents the information transmission period between the communication device 310 and the communication device 312, and the portion of a frame 35 indicates a frame which is assigned to the communication device 311 and represents the information transmission period between the communication device 311 and the communication device 313.

Figure 4:
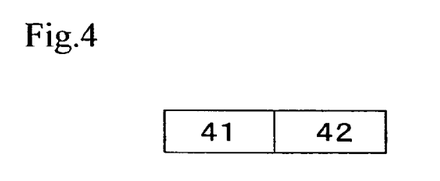
FIG. 4 shows the configuration of the send request information of the time division multiplexing communication system according to the first and second embodiments of the present invention.

FIG. 4 is an explanatory view of the configuration of the send request information about the time division multiplexing communication system according to the first embodiment of the present invention.

The send request information is composed of destination information 41 (communication device ID, etc.) and source information 42 (communication device ID, etc.).

Figure 5:
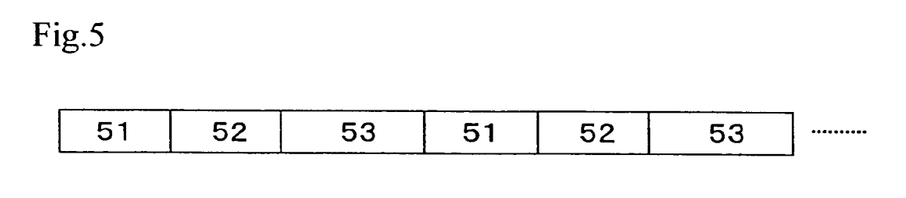
FIG. 5 shows the configuration of the assignment information about the time division multiplexing communication system according to the first and second embodiments of the present invention.

FIG. 5 is an explanatory view of the configuration of the assignment information about the time division multiplexing communication system according to the first embodiment of the present invention.

The assignment information is composed of a combination of a plurality of destination information 51 (communication device ID, etc.) about an assigned transmittal right, source information 52 (communication device ID, etc.) about an assigned transmittal right, and assigned sending period information 53 for each communication device.

Figure 6A:
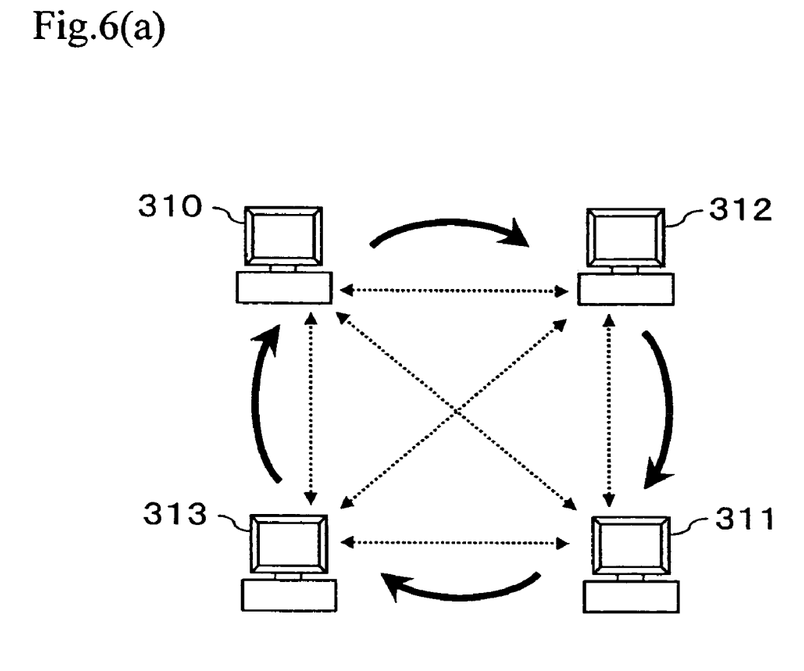
FIG. 6(a) shows the communication path requested by each communication device.

FIG. 6(a) shows the communication path requested by each of the communication devices 310 to 313 with other communication devices in the time division multiplexing communication system according to the first embodiment of the present invention. The dotted line shown in FIG. 6(a) indicates a path through which communications can be performed among the communication devices 310 to 313. The arrow indicated by the solid line shows an example of a communication path for which a send request is made from each of the communication devices 310 to 313. In this example, a send request is made from each of the communication devices 310, 312, 311, and 313 to each of the communication devices 312, 311, 313, 310.

Figure 6B:
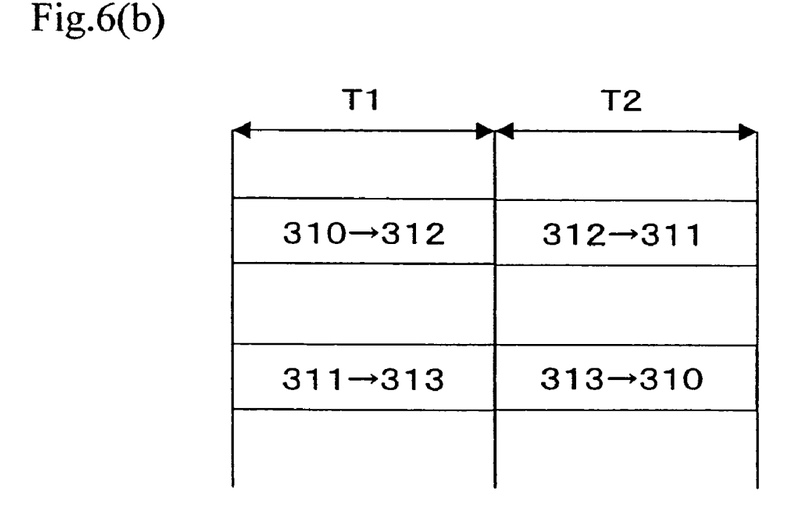
FIG. 6(b) shows the time assigned for communication between communication devices by the transmittal right control device in the time division multiplexing communication system according to the first embodiment of the present invention.

FIG. 6(b) shows an assignment table of the communication time assigned to each of the communication devices when the sending right control device 320 receives requests for communications in the same time period from the communication devices 310 to 313 shown in FIG. 6(a).

In FIG. 6(b), the communication from the communication device 310 to the communication device 312 and the communication from the communication device 311 to the communication device 313 are assigned for the time period T1. Additionally, the communication from the communication device 312 to the communication device 311 and the communication from the communication device 313 to the communication device 310 are assigned for the time period T2. The time periods T1 and T2 respectively correspond to the frames 34 and 35 in the time frame shown in FIG. 3.

The operations of the time division multiplexing communication system according to the first embodiment of the present invention performed when send requests from the communication devices 310 to 313 shown in FIG. 6(a) are issued for the same time period are described below by referring to FIGS. 1 to 6.

An embodiment of the communication control method of a communication system according to the present invention is also described below by explaining the operations of the time division multiplexing communication system according to the first embodiment of the present invention (the explanation also holds true with other embodiments).

The transmittal right control device 320 manages the connection states of the coaxial terminal units 330 to 333 and 335 in the switch unit 306 of the switch device 307. The transmittal right control device 320 issues to the switch control unit 305 an instruction to switch the switch unit 306 via the coaxial cable connected to the coaxial terminal unit 335, and the switch control unit 305 accepts the instruction and switches the connection status of the switch unit 306.

The transmittal right control device 320 issues to the switch control unit 305 to connect the transmittal right control device 320 to all of the communication devices 310 to 313 in the send request period 31 and the transmittal right notification period 32 shown in FIG. 3. Therefore, in these periods, the switch unit 306 is set in the status in which all of the coaxial terminal units 330 to 333 and 335 are mutually connected as shown in FIG. 1.

First, in the send request period 31 shown in FIG. 3, each of the communication devices 310 to 313 transmits to the transmittal right control device 320 a request for time for communication with another communication device. In this example, as shown in FIG. 6(a), it is assumed that send requests are issued to the transmittal right control device 320 from the communication device 310 for communication with the communication device 312, from the communication device 312 for communication with the communication device 311, from the communication device 311 for communication with the communication device 313, from the communication device 313 for communication with the communication device 310. These send requests are assumed to have been issued for the same time period.

The communication device 310 generates send request information shown in FIG. 4 according to the destination information 41 (communication device ID, etc.) about the destination communication device 312 and the source information 42 (communication device ID, etc.) about the source communication device 310, and transmits the send request information to the transmittal right control device 320 through the switch device 307 in the send request period 31.

The communication device 311, communication device 312, and communication device 313 similarly generate the send request information, and transmit the send request information to the transmittal right control device 320 through the switch device 307 in the send request period 31.

Next, the transmittal right control device 320 assigns the communication time between communication devices at the send requests from the communication devices 310 to 313. The transmittal right control device 320 performs the assignment of communication time such that the combinations of communication devices not overlapping each other can be assigned the same time period (same time frame).

As shown in FIG. 6(b), the communication from the communication device 310 to the communication device 312 and the communication from the communication device 311 to the communication device 313 are assigned to the same time period T1. Since the connection between the communication devices 311 and 312 does not overlap the connection between the communication devices 311 and 313, these communications can be simultaneously performed by the switch using the switch unit 306.

The communication from the communication device 312 to the communication device 311 is assigned to a different time period T2 from the time period assigned to the communication from the communication device 310 to the communication device 312 because there is an overlapping portion (in these communications, the communication devices 310 and 311 are to simultaneously communicate with the communication device 312) between these two communications, which does not permit the assignment of the same time period.

The transmittal right control device 320 generates the assignment information shown in FIG. 5 according to the information about the communication time period assigned as shown in FIG. 6(b), and transmits the assignment information to each of the communication devices 310 to 313 in the transmittal right notification period 32. Since the transmittal right control device 320 is connected to the communication devices 310 to 313 through the switch unit 6 as shown in FIG. 1, the assignment information transmitted from the transmittal right control device 320 is received by all of the communication devices 310 to 313 through the switch device 307 in the transmittal right notification period 32.

Next, each of the communication devices 310 to 313 communicates with another communication device according to the assignment information received from the transmittal right control device 320 in the assigned time period. When the communications are performed among the communication devices, the transmittal right control device 320 issues an instruction to the switch control unit 305 to switch the connection status of the switch unit 306.

The communication device 310 transmits transmission information to the communication device 312 through the switch device 307 in the time period of the frame 34 in the information transmission period 33 shown in FIG. 3. The time period of the frame 34 shown in FIG. 3 is a time period T1 assigned as shown in FIG. 6(b). The communication device 311 transmits transmission information to the communication device 313 in the time period of the same frame 34.

The transmittal right control device 320 issues to the switch control unit 305 an instruction to control the switch of the switch unit 6 so that the communications can be simultaneously performed in the time period of the frame 34. FIG. 2 shows the connection status of the switch unit 6 in the time period of the frame 34. In FIG. 2, connections are permitted only between the coaxial terminal units 330 and 332 and between the coaxial terminal units 331 and 333. Therefore, the communication between the communication devices 310 and 312 and the communication between the communication devices 311 and 313 can be simultaneously performed.

The transmittal right control device 320 issues to the switch control unit 305 an instruction to control the switch of the switch unit 6 for each frame (frames 34, 35, etc.) in the information transmission period 33 depending on the combination of the communication devices. For example, in the period of the frame 35 (period of the time period T2 shown in FIG. 6(b)), control is performed to connect between the coaxial terminal units 330 and 333 and between the coaxial terminal units 331 and 332, there by permitting the simultaneous communications between the communication devices 310 and 313 and between the communication devices 311 and 312.

In the description above, an example of a send request indicated by the arrow in the solid line as shown in FIG. 6(a) is explained, but the same process can be performed in case where there was a send request for other communication paths.

In the embodiment 1, there are five coaxial terminal units provided for the switch device 307, but there is no limit to the number of coaxial terminal units, and any number of the unit can be included. Similarly, there are four communication devices connected to the switch device 307 in the explanation above, but the number of connected communication devices is not limited, and any number of devices can be connected.

According to the first embodiment, the switch device 307 can connect two sets of communication devices in the same time period, but three or more sets of communication devices can be connected in the same time period.

Figure 7:
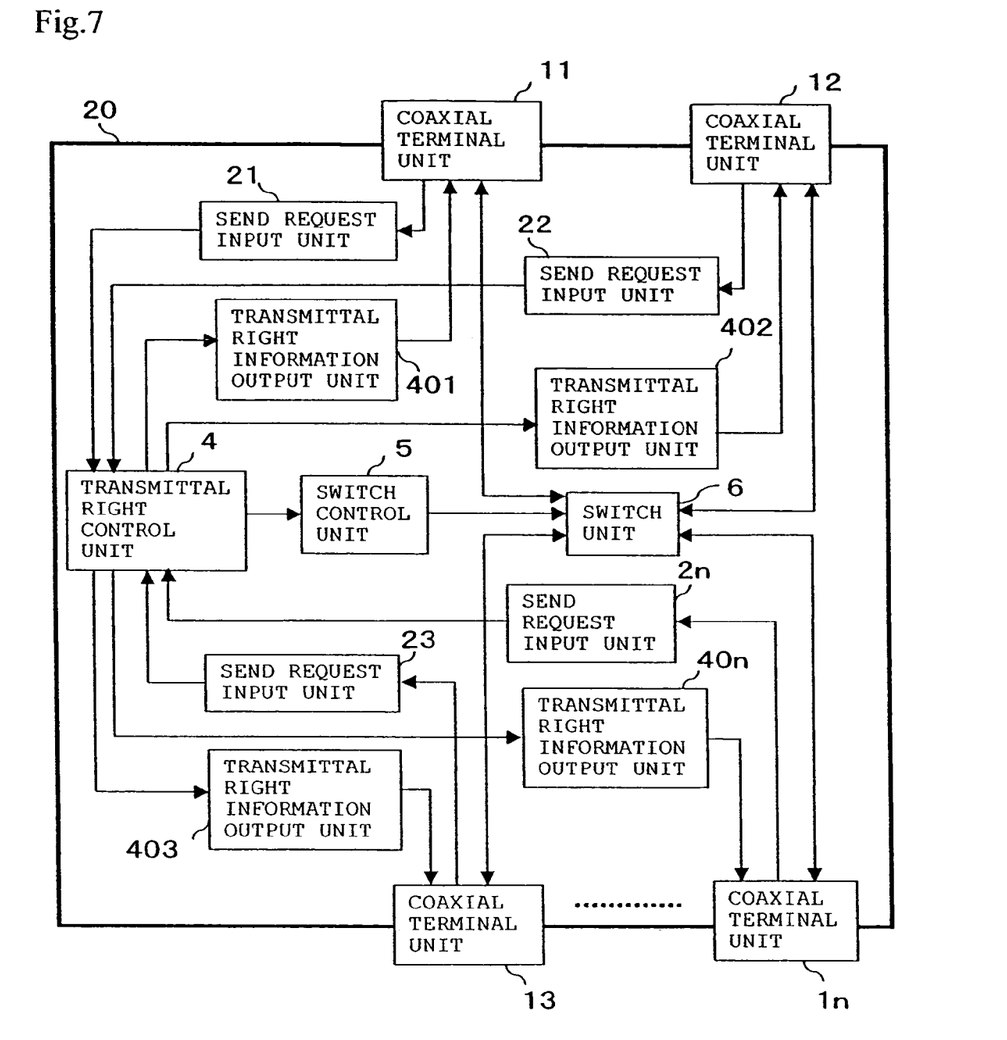
FIG. 7 is a block diagram of the configuration of the switch system according to the second embodiment of the present invention.
Figure 8:
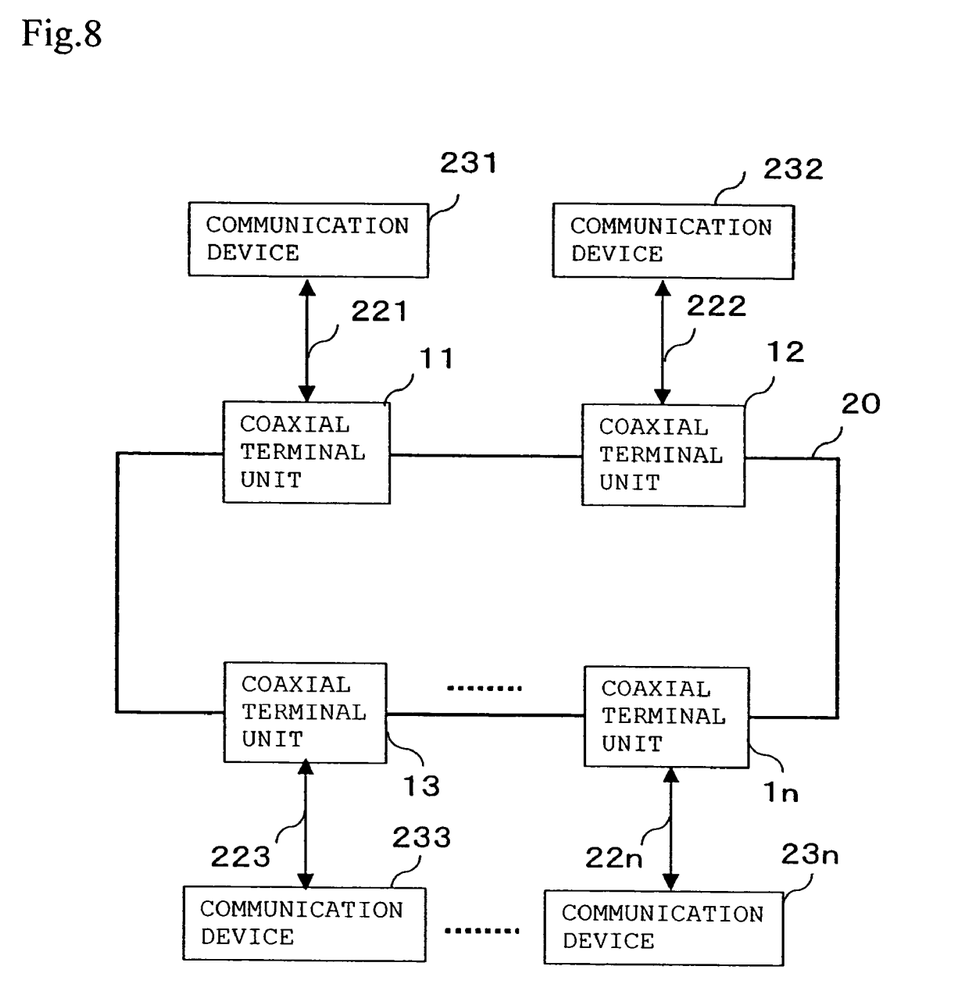
FIG. 8 shows the configuration of the time division multiplexing communication system according to the second embodiment of the present invention.

FIG. 7 is a block diagram of the configuration of the switch system according to the second embodiment of the present invention. FIG. 8 is a block diagram of the configuration of the time division multiplexing communication system using the switch system.

A switch system 20 according to the present embodiment allows the switch device 307 in the first embodiment to have the functions of assigning communication time between the communication devices and switching the connection between the coaxial terminals. Using the switch system 20, a time division multiplexing communication system not requiring a transmittal right control device configured as a separate device can be realized as shown in FIG. 8.

As shown in FIG. 7, the switch system 20 according to the second embodiment is provided with coaxial terminal units 11 to 1n to which a coaxial cable is connected. To each of the coaxial terminal units 11 to 1n, send request input units 21 to 2n and transmittal right information output units 401 to 40n are connected. The send request input units 21 to 2n receive transmission information from the coaxial cable connected to the coaxial terminal units 11 to 1n. The transmittal right information output units 401 to 40n output transmission information to the coaxial cable connected to the coaxial terminal units 11 to 1n. The descriptions 1n, 2n, 40n, etc. indicate that there is no limit to the number of coaxial terminal units, send request input units, and transmittal right information output units provided for the switch system 20, and these units are equal in number in the switch system 20.

The switch system 20 is an example of a time division multiplexing communication switch system according to the present invention. The coaxial terminal units 11 to 1n are examples of a plurality of terminals according to the present invention.

The send request input units 21 to 2n and the transmittal right information output units 401 to 40n are all connected to a transmittal right control unit 4. The transmittal right control unit 4 controls the assignment of a transmittal right such that the same communication device communicating information in a specific time period cannot be assigned double according to the source communication device information and the destination communication device information in the send request from the communication device received by the send request input units 21 to 2n, generates transmittal right assignment information, and transmits the transmittal right assignment information to each communication device using the transmittal right information output units 401 to 40n.

A switch unit 6 separately switches connections among the coaxial terminal units 11 to 1n. A switch control unit 5 is connected between the transmittal right control unit 4 and the switch unit 6 so that the switch control unit 5 controls the switch of the connection in the switch unit 6 according to the transmittal right assignment information from the transmittal right control unit 4 to switch the connection among the coaxial terminal units 11 to 1n.

As shown in FIG. 8, the time division multiplexing communication system according to the second embodiment is composed of the switch system 20 shown in FIG. 7 and communication devices 231 to 23n connected through coaxial transmission lines 221 to 22n connected to each of the coaxial terminal units 11 to 1n.

The configurations of the time frame, the send request information, and the assignment information used in the time division multiplexing communication system according to the second embodiment are the same as those according to the first embodiment, and shown in FIGS. 3, 4, and 5.

Next, the operations of the time division multiplexing communication system according to the second embodiment of the present invention are explained below by referring to FIGS. 7 and 8, and FIGS. 3 to 5.

First, in the send request period 31 shown in FIG. 3, each of the communication devices 231 to 23n transmit a request for time to communicate with another communication device to the switch system 20.

Each of the communication devices 231 to 23n generates send request information shown in FIG. 4 according to the destination information 41 (communication device ID, etc.) about the destination communication device and the source information 42 (communication device ID, etc.) about the source communication device, and transmits the information to the switch system 20 through the coaxial transmission lines 221 to 22n in the send request period 31.

The send request information transmitted from each of the communication devices 231 to 23n is received by the coaxial terminal units 11 to 1n connected to the coaxial transmission lines 221 to 22n of the switch system 20, and transmitted to the transmittal right control unit 4 from the send request input units 21 to 2n connected to the coaxial terminal units 11 to 1n.

The transmittal right control unit 4 assigns time for a transmittal right not to double assign a communication device communicating in the same time period according to the source information and destination information contained in the send request information from the communication devices 231 to 23n received in the send request period 31, and notifies the switch control unit 5 of the assigned information.

The transmittal right control unit 4 generates the transmittal right information composed of a combination of the destination information 51, the source information 52, and the sending period information 53 as shown in FIG. 5, and outputs the transmittal right information from the transmittal right information output units 401 to 40n in the transmittal right notification period 32. The transmittal right information is transmitted from the coaxial terminal units 11 to 1n to the communication devices 231 to 23n through the coaxial transmission lines 221 to 22n.

In the first embodiment, the switch unit 306 is controlled to mutually connect all of the coaxial terminal units 330 to 333 and 335 in the send request period 31 and the transmittal right notification period 32 as shown in FIG. 3. However, in the second embodiment, it is not necessary to similarly control the switch unit 6 in these periods. In the second embodiment, the connection between the transmittal right control unit 4 and the coaxial terminal units 11 to 1n is made through the send request input units 21 to 2n and the transmittal right information output units 401 to 40n not through the switch unit 6.

Next, each of the communication devices 231 to 23n receives the transmittal right information from the coaxial transmission lines 221 to 22n in the transmittal right notification period 32, and transmits the transmission information to other communication devices 231 to 23n through the coaxial transmission lines 221 to 22n in the information transmission period (for example, the period of the frame 34) in the information transmission period 33 assigned according to the destination information 51, the source information 52, and the sending period information 53.

The switch control unit 5 of the switch system 20 controls the switch of the connection of the switch unit 6 so that communication can be performed between assigned communication devices according to the assignment information notified from the transmittal right control unit 4 in each information transmission period (for example, the period of the frame 34) in the information transmission period 33. For example, when the communications between the communication devices 231 to 232 and between the communication devices 233 to 234 are assigned in the same information transmission period, the connection of the switch unit 6 is switched to connect only between the coaxial terminal units 11 to 12 and between the coaxial terminal units 13 to 14.

The time division multiplexing communication system according to each embodiment is explained above with the configuration connected via a coaxial cable, but the present invention can be applied to any the time division multiplexing communication system connected via a cable other than a coaxial cable.

Some of the conventional time division multiplexing communication systems increase the transmission rate by, for example, using plural frequency bands to enhance the transmission efficiency. However, in this case, the frequency band width to be used becomes large. On the other hand, in the time division multiplexing communication system according to the present invention, plural combinations of communication devices can be simultaneously used at the same frequency. Therefore, the transmission efficiency can be enhanced without increasing the frequency band width.

As described above, the time division multiplexing communication system according to the present invention allows plural communication devices to perform communications in the same time period unless a combination of a destination communication device and a source communication device is distinct, and thereby provides for effective use of the frequency band and communications with high transmission efficiency. Therefore, communications with immediacy such as VoIP, etc. can be realized.

The program according to the present invention is a program used to direct a computer to perform the function of the switch control unit and the transmittal right control unit of the time division multiplexing communication system according to the present invention, and cooperates with the computer.

The record medium according to the present invention stores a program used to direct a computer to perform the function of the switch control unit and the transmittal right control unit of the time division multiplexing communication system according to the present invention. It is computer-readable and the read program is used in cooperation with the computer.

The program according to the present invention is a program used to direct a computer to perform the function of the switch control unit and the transmittal right control unit of the time division multiplexing communication switch system according to the present invention, and cooperates with the computer.

The record medium according to the present invention stores a program used to direct a computer to perform the function of the switch control unit and the transmittal right control unit of the time division multiplexing communication switch system according to the present invention. It is computer-readable and the read program is used in cooperation with the computer.

An aspect of the use of the program according to the present invention can be an operation of cooperating with a computer as being recorded on a computer-readable record medium.

A record medium can be ROM, etc.

The computer according to the present invention is not limited to complete hardware such as a CPU, etc., but can be firmware, an OS, and peripheral equipment.

As explained above, the configuration according to the present invention can be realized as software or hardware.

A send request from a communication device is discriminated, a transmittal right is assigned between a plurality of communication devices, which a combination of a destination communication device and a source communication device is distinct in the same time period, a switch unit is controlled, and the switch unit is controlled such that only the cables between the communication devices to perform communications can be connected, thereby using the same frequency band among a plurality of communication devices and providing an efficient communication environment by effectively using the frequency band. As a result, the present invention can be applied to a use indispensable for efficiently transmitting a large volume of high quality data such as high quality images, etc.

What is claimed is:

1. A time division multiplexing communication system, comprising:
    a plurality of communication devices;
    a switch device having a plurality of terminals to which at least the plurality of communication devices are respectively connected, a switch unit capable of mutually connecting all of the plurality of terminals and individually connecting the plurality of terminals, and a switch control unit for controlling a connection status of the switch unit; and
    a transmittal right control unit for managing the connection status of the switch unit, which is connected to at least one of the plurality of terminals, for (a) receiving, from each of the communication devices, a request for time to communicate with another communication device, with all of the plurality of terminals being mutually connected, (b) determining, by time division multiplexing, allocation of the time to communicate without signal interference among the communication devices at the request in a way that (i) communications among the communication devices in non-overlapping combinations are performed in a same time period, and (ii) communications among the communication devices in overlapping combinations are performed in a different time period, (c) notifying each of the communication devices of the determined allocation of the time, and (d) instructing the switch control unit such that a switch of a connection between the plurality of terminals are individually controlled based on the determined allocation of the time.

2. The time division multiplexing communication system according to claim 1, wherein
    the plurality of communication devices and the transmittal right control unit are respectively connected to the plurality of terminals through a coaxial cable.

3. The time division multiplexing communication system according to claim 1, wherein
    signals used in communication between the communication devices are signals at the same frequency band.

4. A computer readable medium encoded with a computer program used to direct a computer to function as:
    the switch control unit for controlling the connection status of the switch unit; and
    the transmittal right control unit for determining the allocation of the time to communicate among the communication devices, and instructing the switch control unit, which belong to the time division multiplexing communication switch system according to claim 1.

5. A time division multiplexing communication switch system, comprising:

a plurality of terminals to which a plurality of communication devices are respectively connected;

a switch unit capable of individually connecting the plurality of terminals;

a switch control unit for controlling a connection status of the switch unit; and a transmittal right control unit for managing the connection status of the switch unit, which is connected to each of the plurality of terminals, for (a) receiving, from each of the communication devices, a request for time to communicate with another communication device, (b) determining, by time division multiplexing, allocation of the time to communicate without signal interference among the communication devices at the request in a way that (i) communications among the communication devices in non-overlapping combinations are performed in a same time period, and (ii) communications among the communication devices in overlapping combinations are performed in a different time period, (c) notifying each of the communication devices of the determined allocation of the time, and (d) instructing the switch control unit such that a switch of a connection between the plurality of terminals are individually controlled based on the determined allocation of the time.

6. The time division multiplexing communication switch system according to claim 5, wherein the plurality of communication devices are respectively connected to the plurality of terminals through a coaxial cable.

7. The time division multiplexing communication switch system according to claim 5, wherein signals used in communication between the communication devices are signals at the same frequency band.

8. A computer readable medium encoded with a computer program used to direct a computer to function as:

the switch control unit for controlling the connection status of the switch unit; and the transmittal right control unit for determining the allocation of the time to communicate among the communication devices, and instructing the switch control unit, which belong to the time division multiplexing communication switch system according to claim 5.

9. A communication control method of a communication system performing communications, among a plurality of communication devices connected in the system, by time division multiplexing, the communication control method comprising:

a determination notification step for (a) receiving, from each of the communication devices, a request for time to communicate with another communication device, with all of a plurality of terminals to which at least the plurality of communication devices are connected being mutually connected, (b) determining, by time division multiplexing, allocation of the time to communicate without signal interference among the communication devices at the request in a way that (i) communications among the communication devices in non-overlapping combinations are performed in a same time period, and (ii) communication among the communication devices in overlapping combinations are performed in a different time period, and (c) notifying each of the communication devices of the determined allocation of the time; and a control step for individually controlling a switch of a connection between the plurality of terminals based on the determined allocation of the time.

10. A communication control method of a communication system performing communications, among a plurality of communication devices connected in the system, by time division multiplexing, the communication control method comprising:

a determination notification step for (a) receiving, from each of the communication devices, a request for time to communicate with another communication device, with the plurality of communication devices being respectively connected to a plurality of terminals, (b) determining, by time division multiplexing, allocation of the time to communicate without signal interference among the communication devices at the request in a way that (i) communications among the communication devices in non-overlapping combinations are performed in a same time period, and (ii) communications among the communication devices in overlapping combinations are performed in a different time period, and (c) notifying each of the communication devices of the determined allocation of the time; and a control step for individually controlling a switch of a connection between the plurality of terminals based on the determined allocation of the time.

\* \* \* \* \*